United States Patent Office 3,518,214
Patented June 30, 1970

3,518,214
SYNTHETIC RUBBER MANUFACTURE
Charles Glenn Wheelus, Panama City, Fla., assignor, by mesne assignments, to Arizona Chemical Company, New York, N.Y., a corporation of Delaware
No Drawing. Continuation-in-part of application Ser. No. 692,713, Dec. 22, 1967. This application Nov. 27, 1968, Ser. No. 779,605
Int. Cl. C08d 1/09, 31/06
U.S. Cl. 260—27          18 Claims

ABSTRACT OF THE DISCLOSURE

In synthetic rubber manufacturing processes wherein aqueous emulsions of butadiene and styrene or butadiene and crylonitrile or other vinyl monomer are prepared with an emulsifying agent containing a water-soluble soap of a disproportionated rosin and are polymerized in the presence of a free radical catalyst system, the adverse action of free oxygen on the polymerization is offset by heat-modifying the disproportionated rosin before it is converted into its soap. The heat-modification is obtained by maintaining the rosin at about 250° C. to 300° C. for about 1 to 18 hours at atmospheric or subatmospheric pressures.

---

This is a continuation-in-part of my copending application Ser. No. 692,713, filed Dec. 22, 1967, now abandoned.

This invention relates to emulsion polymerization processes, such as those used in the manufacture of synthetic rubbers, wherein aqueous emulsions of a diolefin such as butadiene and a vinyl monomer such as styrene or acrylonitrile are prepared and the unsaturated monomers are copolymerized in the presence of a free radical catalyst system. More particularly, this invention is directed to improvements in these processes wherein the adverse effect of free oxygen on the copolymerization reaction is offset or counteracted by the use of a new class of disproportionated rosin soaps in preparing the monomer emulsions.

In synthetic rubber manufacturing processes of this type, and particularly in the manufacture of GRS–10 and nitrile rubbers, the alkali metal and other water-soluble soaps of disproportionated rosin are commonly used as emulsifying agents, either alone or admixed with fatty acid soaps. Standard recipes employing these and other similar emulsifying agents are described, for example, in Whitby, "Snythetic Rubber" (1954 edition) page 217. A typical GRS formulation that is used both commercially and in the laboratory is the "1500-type SBR recipe." Other recipes for use in nitrile rubber formulations, in GRS latexes of either high or low solids, and other processes wherein diolefins such as butadiene or mixtures thereof with styrene, acrylonitrile, alkyl acrylates, 2-vinylpyridine and the like are emulsified in aqueous systems and polymerized with free radical catalysts are also described in this book.

The polymerization catalysts and catalyst systems used in these emulsion polymerizations are also described in the Whitby book. They include persulfate catalysts such as potassium persulfate, peroxide catalysts such as cumene hydroperoxide, hydrogen peroxide and the like, and redox systems such as those in which ferrous sulfate and sodium formaldehyde sulfoxylate are used with para-menthane hydroperoxide. Modifiers such as dodecyl mercaptan and electrolytes such as sodium phosphates and potassium chloride may also be present.

Emulsion polymerization processes of these types are seldom carried to completion. Ordinarily, the polymerization is so conducted that about 60% to 70% of the monomers are polymerized, after which it is short-stopped and the reactor is discharged and refilled with fresh emulsion. Under these circumstances it is difficult or impossible to prevent small amounts of oxygen from finding its way into the reactor and in many cases, therefore, the polymerization must be carried out in the presence of oxygen. This is very undesirable, as free oxygen lengthens the induction period of most of the above-described polymerization systems and may seriously reduce the daily output of the plant.

My present invention is based on the discovery that this adverse effect of oxygen can be offset or overcome to a substantial extent by the presence in the polymerization system of a new class of disproportionated rosin soaps. These are the alkali metal, ammonium and amine salts of disproportionated rosin that has been modified by heating at about 250° C. to 300° C. or slightly higher for about 1 to 18 hours. Heat-modified rosin of this character is a new article of commerce, and will be sold as such to synthetic rubber manufactures for conversion into the water-soluble soaps that are used as emulsifying agents in preparing synthetic rubber-producing compositions. The soaps of heat-modified disproportionated rosin with alkali metal hydroxides or carbonates, or with ammonia or amines such as morpholine are also new products, and are claimed as such.

This aspect of my invention therefore includes the new heat-modified disproportionated rosin, its water-soluble soaps, aqueous butadiene-styrene and other synthetic rubber-producing emulsions containing the new soaps as emulsifying agents, and methods of producing synthetic rubbers in which these emulsions are polymerized.

As has been indicated, it is an important advantage of my invention that emulsions prepared with the new soaps of heat-modified disproportionated rosin are better able to withstand the adverse effect of free oxygen during polymerization than are comparable emulsions prepared with other emulsifying agents. It is, however, a further and perhaps even more important advantage than the new emulsions prepared with heat-modified disproportionated rosins actually polymerize faster than those prepared with other emulsifying agents under comparable polymerization conditions regardless of whether air is introduced or not. In other words, the new rosin soaps, in addition to their unusual property of offsetting the adverse effect of oxygen, also promote the speed of polymerization.

Another important feature of my invention is the application of its principles to tall oil rosin. Soaps of disproportionated tall oil rosins are used commercially in synthetic rubber recipes, such as those for GRS–10 rubbers, with results that are about the same as those obtained with disproportionated wood rosin. I have found, however, that outstanding results are obtained when disproportionated tall oil rosins are heat-modified and then converted into water-soluble soaps; these soaps give greatly improved polymerization rates when used as emulsifiers in free radical type emulsion polymerization recipes. Thus, for example, the presence of about 1% to 8% of the potassium soap of one of the hereinafter described new rosins in styrene-butadiene emulsion polymerization systems will result in from 20% to 30% reduction in the time required to reach 60–70% conversion at 5° C.

The new rosins of my invention are produced by subjecting disproportionated rosin to a heat treatment at a temperature of at least 250° C., and preferably at 260° C. to 300° C. or higher, at atmospheric or subatmospheric pressures. Disproportionated rosin is a rosin wherein two atoms of hydrogen have been removed from the two-double bond abietic-type acids with rearrangement to form an aromatic nucleus; as used herein it is a rosin wherein the abietic acid content has been reduced by this procedure to less than five percent and preferably to not more than about 1%. This is done commercially by heating the rosin in the presence of a disproportionation catalyst such as iodine, sulfur, or palladium or platinum as described in U.S. Pat. No. 2,138,183. See also U.S. Pat. No. 2,479,226, wherein the disproportionation reaction is applied to tall oil and alkali metal salts of the product are used in butadiene-styrene polymerizations.

In producing my new heat-modified rosins the disproportionated rosin is held at a temperature between 250° C. and about 300° C. until the product, after conversion into its sodium, potassium or other alkali metal soap, demonstrates a faster conversion of butadiene-styrene emulsion into synthetic rubber when tested in a standard SBR recipe in comparison with a soap of the same rosin before heating. A measurable improvement is obtained after heating for about one hour at these temperatures and the properties of the rosin are improved substantially after two hours, but when heating temperatures of 250° C–270° C. are used it is advisable to continue the heating for times up to about 12 to 18 hours. At higher temperatures, however, and especially in the range of about 290° C.–300° C. the modification proceeds much more rapidly and the desired improvement is obtainable in about 1–6 hours. Heating temperatures up to 325° C. may be used for short times on the order of 0.5–2 hours, but care must be taken to avoid excessive decarboxylation of the rosin.

The heat-modification may be carried out at atmospheric pressures, preferably under a blanket of nitrogen or other inert gas, or subatmospheric pressures limited only by the boiling point of the rosin components but preferably down to about 20 to 50 millimeters of mercury absolute pressure may be used. Heat-modified disproportionated rosins which impart both faster conversions and outstanding resistance to the adverse action of oxygen have been obtained with heating temperatures of 290°–300° C., heating times of from 1 to 4 hours, and reduced pressures of from about 80 to about 300 mm. of mercury absolute. The best results have been obtained when disproportionated tall oil rosins are heated at about 290°–300° C. for about 1 to 2 hours under about 100 mm. of mercury absolute pressure, but comparable results are also obtainable when disproportionated wood rosin or gum rosin is heat-modified under the same conditions.

The heat-modified rosins resulting from this process are new articles of commerce and will be sold as such to synthetic rubber manufacturers for conversion into their alkali metal, ammonium or amine soaps such as the sodium, potassium and morpholine salts. These may be prepared separately by reacting the rosin with aqueous solutions of hydroxides or carbonates of the alkali metals or with ammonium hydroxide, or with a volatile amine such as morpholine, or the soap may be formed in situ by adding its ingredients to the polymerization recipe.

The reasons why soaps of the new heat-modified disproportionated rosins give improved conversions in the emulsion polymerization of olefins and polyolefins have not been definitely determined. It seems likely that they produce soap micelles of a more favorable character, for it is generally agreed that these polymerizations are initiated in such micelles. It is well known that rosins contain substances which may act as inhibitors in the polymerization reaction. These compounds may be altered by the heat-treating conditions in such a manner that they no longer act as inhibitors. It will be understood, therefore, that the invention is not primarily dependent on these or other theoretical possibilities, the controlling fact being that improved conversions are obtained when the soaps of heat-modified disproportionated rosin are used in olefin polymerizations.

It will also be understood that the decreased time of polymerization is obtainable in any aqueous emulsion polymerization system in which rosin soaps are used. Thus, in addition to GRS rubber, the new soaps may be used in nitrile rubber formulations, in GRS latexes or either high or low solids, and in general wherever polyolefins such as butadiene or mixtures thereof with styrene, acrylonitrile, alkyl acrylates, 2-vinylpyridine and the like are polymerized in aqueous systems, usually at temperatures ranging from about 4° C. to about 50° C–60° C. It will also be understood that they may be used with any of the catalyst systems normally employed in these polymerizations. It will be seen, therefore, that the new soaps of the invention may be used in any of the presently-known emulsified olefin polymerization systems.

A standard type of formulation in wide commercial use for the production of cold rubber is the sulfoxylate recipe, in which the activator contains sodium formaldehyde sulfoxylate, ferrous sulfate and Versene Fe–3 or other chelating agent. See Whitby, "Snythetic Rubber" (1954 edition), page 217. A typical GR–S formulation that is used both commercially and in the laboratory is the "1500-type SBR recipe." When used for test purposes this is as follows:

LABORATORY 1500 RECIPE

The following components are charged to a 32-ounce bottle and polymerization is allowed to take place for 8 hours at 5° C.

Butadiene—107 grams, freshly distilled
Styrene—46 grams, stabilized with t-butylpyrocatechol
Water—275 g.
Potassium soap of disproportionated rosin—6.90 g. 100% solids basis
Tamol N [1]—0.150 g.
Electrolyte (KCl.)—0.610
EDTA (Chelating agent)—0.025 g., 100% tetra sodium salt of ethylenediamine tetraacetic acid basis
Tertiary dodecyl mercaptan—0.310 g. 100% basis
p-Menthane hydroperoxide—0.38–0.046 g., 100% basis
Sodium formaldehyde sulfoxylate—0.36–0.043 g.
Ferrous sulfate—0.013–0.015 g.

[1] Tamol N is a salt of a naphthalene sulfonate-formaldehyde condensate.

Oxygen is a known inhibitor in the polymerization of styrene-butadiene. Since it is difficult to remove all traces of oxygen from a commercial polymerization system, air is sometimes deliberately introduced into the experimental system at the rate of 4 ml. per 100 g. monomer to determine its effect on the polymerization. This is equivalent to 6.2 ml. in the recipe outlined above. This was done in all of the present examples except where otherwise stated.

The charging procedure is as follows: The potassium soap of disproportioned rosin, Tamol N, and Kcl are dissolved in 200 g. distilled water and adjusted with 2 N KOH to a pH of 10.5. This solution, along with 75 ml. additional distilled water, is charged to a bottle previously sparged with nitrogen. Styrene, less an amount used to dissolve the para-menthane hydroperoxide and tertiary dodecyl mercaptan, is added to the bottle. The tertiary dodecyl mercaptan and paramenthane hydroperoxide separately dissolved in styrene are added next to the bottle. A slight excess of butadiene is weighed into the bottle, the excess allowed to evaporate, and the bottle quickly capped with a metal cap and neoprene seal. The cap has a small hole so that solutions may be added and samples removed through the neoprene seal by use of a hypodermic syringe.

The sodium formaldehyde sulfoxylate, sodium EDTA, and ferrous sulfate are dissolved in water under a nitrogen blanket. The bottles are placed in racks in a polymerization apparatus which is maintained at 5° C. The bottles are rotated until the contents are thoroughly emulsified and chilled. An appropriate amount of the ferrous sulfate, sodium formaldehyde sulfoxylate, and sodium EDTA solution is charged to each bottle and the bottles are rotated 8 hours after which the reaction is short-stopped.

After reaction times of 8 hours the amount of solids is determined. The percent conversion of monomer to polymer is calculated from this figure.

Alkali metal soaps of the heat-modified disproportionated tall oil rosins of the invention can also be used as emulsifying agents in making nitrile rubber. Thus, for example, they can be substituted for the soap flakes in the recipe shown on page 802 of the Whitby publication cited above.

The rosin used in Examples 1–4 was a catalytically produced disproportionated tall oil rosin, prepared as described in U.S. Pat. No. 2,138,183 and having the following characteristics:

| | |
|---|---|
| Acid number | 167 |
| Saponification number | 173 |
| Unsaponifiables, percent | 7.0 |
| Abietic acid (U.V.), percent | 0.7 |
| Optical rotation | +53 |
| Softening point, ° C. | 74 |

The invention will be further described and illustrated by the following examples, which describe specific embodiments thereof. It will be understood, however, that although these examples may show certain features in detail, the invention in its broader aspects is not limited thereto.

EXAMPLE 1

A sample of the above-described disproportionated tall oil rosin weighing 634 grams was charged to a 1,000 ml. 3-neck flask to which was attached a gas inlet tube, a thermometer and a steam-heated reflux condenser. Heat was applied and a temperature of 260°C. to 270° C. was maintained for 18 hours without agitation while approximately 100 ml. of nitrogen gas was introduced to blanket the rosin during treatment.

The resulting heat-modified disproportionated tall oil rosin was converted into its potassium soap by reaction with potassium hydroxide. A potassium soap was also made from a portion of the above-described disproportionated rosin that had not been modified by heating, for use as a control. Both soaps were used as the emulsifying agent in the laboratory 1500 recipe.

Eight polymerization bottles were prepared, four for each soap. After all components of the recipe were charged 6.2 ml. of air was added to two bottles containing the heat-modified rosin soap, and to two bottles containing the unmodified soap using a hypodermic syringe. Polymerization was then carried out by shaking the bottles for 8 hours at 5° C. after which the degree of conversion was measured. The following results are in each case the average of two bottles.

| | Percent conversion, monomers to polymer | |
|---|---|---|
| | No air | 6.2 ml. air |
| Control | 60.1 | 29.4 |
| Heat-modified | 70.7 | 63.7 |

EXAMPLE 2

Another portion of the same disproporionated tall oil rosin was charged into the equipment described in Example 1, and heated at 270° C. for varying times under 100 ml. of nitrogen per minute. Samples were removed after the first 3 hours of heating, after an additional 7 hours, and after 6 hours longer and were converted into their potassium soaps. These were used in preparing 1500-type SBR recipes, as described above, along with a control containing a potassium soap of unmodified disproportionated rosin. Two bottles were charged with each sample after which 6.2 ml. of air was added, and the polymerization was carried out at 5° C. for 8 hours. The following results are in each case the average of two bottles.

| Sample No. | Hours at 270° C. | Percent conversion of styrene-butadiene to polymer |
|---|---|---|
| Control | None | 27.7 |
| 1 | 3 | 35.5 |
| 2 | 10 | 43.8 |
| 3 | 16 | 76.7 |

These results show that the advantages obtained by heat-modifying the disproportionated tall oil rosin increase with heating, but that the greatest improvements are noted in the last half of the heating period, i.e., after heating for from about 8 to about 18 hours at 270° C. Other tests have shown that comparable results are obtained with much shorter heating times when higher temperatures up to about 300° C. are used; for example the potassium soap of the same disproportionated rosin, heated in the absence of oxygen at 300° C. for 1 hour, gave a 50% conversion of monomer to polymer while a 4 hour heating at the same temperature produced a modified rosin whose potassium soap gave a 60% conversion. Both results were obtained in the above-described test after adding 6.2 ml. of air.

EXAMPLE 3

The effect of heating times at varying temperatures is also shown by the following conversion figures, which were obtained with potassium soaps of the same disproportionated tall oil rosin that had been heated for only two hours at the temperatures indicated, these soaps being used in the recipe and procedures described in Example 1.

| Heating temp., ° C. | Percent conversion |
|---|---|
| None (control) | 11 |
| 200 | 14 |
| 225 | 17 |
| 250 | 28 |
| 275 | 33 |
| 300 | 41 |

EXAMPLE 4

Samples of the same disproportionated tall oil rosin were heated in the equipment of example 1 for the times and at the temperatures shown in the following table. They were then converted into potassium soaps and used in the SBR–1500 type recipe to prepare styrene-butadiene copolymers. The polymerization was for 8 hours at 5° C. in the presence of 6.2 ml. of air, after which the percent conversion of the monomers to polymer was as follows:

HEAT TREATMENT

| Hours: | Temperature, ° C. | Percent conversion to polymer |
|---|---|---|
| 0 | Control | 22 |
| 8 | 250 | 39 |
| 12 | 250 | 40 |
| 16 | 250 | 39 |
| 0 | Control | 19 |
| 8 | 275 | 48 |
| 12 | 275 | 48 |
| 16 | 275 | 57 |
| 0 | Control | 17 |
| 2 | 300 | 44 |
| 3 | 300 | 46 |
| 4 | 300 | 46 |
| 5 | 300 | 49 |

EXAMPLE 5

The procedures of Example 4 were repeated using as starting material samples of a disproportionated tall oil rosin prepared as described in U.S. Pat. No. 3,377,334 and having the following properties:

Acid number _____ 157
Unsaponifiables, percent _____ 9
Abietic acid percent _____ 0.02
Optical rotation _____ 448
Softening point, ° C. _____ 65

These samples were modified by the heat treatments shown in the following table and then converted into their potassium soaps. These were incorporated into the 1500 recipe and tested by the procedures described in Example 1. The results are as follows:

HEAT TREATMENT

|  | Temperature, ° C. | Percent conversion to polymer |
|---|---|---|
| Hours: |  |  |
| 0 | Control | 18 |
| 8 | 250 | 20 |
| 12 | 250 | 24 |
| 16 | 250 | 26 |
| 0 | Control | 23 |
| 8 | 275 | 32 |
| 12 | 275 | 34 |
| 16 | 275 | 41 |
| 0 | Control | 34 |
| 2 | 290 | 37 |
| 3 | 290 | 38 |
| 4 | 290 | 38 |
| 5 | 290 | 45 |
| 0 | Control | 34 |
| 2 | 300 | 40 |
| 4 | 300 | 48 |
| 5 | 300 | 51 |
| 6 | 300 | 56 |

EXAMPLE 6

Wood rosin and gum rosin were disproportionated to an abietic acid content of less than one percent, using the palladium catalyst and method described in U.S. Pat. No. 2,138,183. A portion of each rosin was then heat-modified by maintaining it at 300° C. for 2 hours under a nitrogen gas blanket.

Samples of the unmodified disproportionated rosins and of the heat-modified disproportionated rosins were then tested in the 1500 recipe for 8 hours at 5° C. by the procedure of Example 4, with and without the introduction of air. The results are shown in the following table.

PERCENT CONVERSION

|  | Wood rosin | | Gum rosin | |
|---|---|---|---|---|
|  | No air | 6.2 ml. air | No air | 6.2 ml. air |
| Unmodified | 37 | 9 | 27 | 4 |
| Heat-modified | 45 | 36 | 42 | 32 |

EXAMPLE 7

A 200-g. sample of the disproportionated rosin of Example 1 was charged to a 500-ml., 3-neck flask gas inlet tube, thermometer, distillation heat, condenser, and receiver attached. The flask was purged with nitrogen and evacuated to 70 mm. Hg pressure. The rosin was heated to 300° C. and held at this temperature and pressure for 2 hours. During this time a distillate fraction amounting to 6% of the original charge was collected.

The acid number of the treated rosin was 135.

A potassium soap was prepared from the above treated rosin. A portion of the soap was acidified to free organic acids which were extracted with ether and washed with water to remove mineral acid.

The acid number of the extracted organic acids was 163. Thus the low acid number of the treated rosin was due to the formation of anhydrides which split during the soap making process.

The above soap along with a soap from a disproportionated rosin treated at 300° C. for 2 hours at atmospheric pressure under nitrogen and a soap from an untreated disproportionated rosin were used separately as emulsifiers for the components of a laboratory 1500 type styrene butadiene rubber recipe. In addition to the normal components of the recipe, 4 ml. air was charged for each 100 g. styrene and butadiene used in the recipe. The percent conversion of styrene and butadiene to rubber was measured for each soap. Results were as follows:

Percent
Control soap from untreated rosin _____ 22.8
Soap from rosin treated at 300° C. and 70 mm. Hg _ 48.7
Soap from rosin treated at 300° C. under nitrogen _ 43.6

EXAMPLE 8

A sample of the disproportionated rosin of Example 5 was treated in a 500-ml., 3-neck flask with gas inlet adapter, thermometer, and a steam heated reflux condenser attached. Agitation was supplied by a magnetic stirrer.

The rosin was blanketed with nitrogen and the nitrogen valve was then closed. The sample was evacuated and treated at the pressures, time, and temperature indicated in the table below. The percent conversion of styrene and butadiene to rubber is given without air present and with 4 ml. air per 100 g. styrene and butadiene present. Also, the acid number of the treated rosin and the rosin extracted from each soap is given.

| Treating conditions | | | Percent conversion of styrene-butadiene to rubber | | Acid number of treated rosin | Acid number of rosin extracted from soap |
|---|---|---|---|---|---|---|
| Time, hours | Temperature, ° C. | Pressure, mm. Hg | 0 ml. air | 4 ml. air/ 100 g. monomer | | |
| 2 | 300 | (1) | 52.9 | 35.1 | | |
| 2 | 300 | 100 | 56.3 | 48.4 | | |
| 2 | 300 | 600 | 51.6 | 39.7 | 159.9 | |
| 2 | 300 | 300 | 53.5 | 42.2 | 158.2 | 163.3 |
| 1 | 300 | 100 | 54.0 | 49.7 | 146.1 | 158.5 |
| 2 | 300 | 100 | 56.6 | 50.7 | | |
| 2 | 300 | 200 | 50.5 | 45.7 | 154.1 | |
| 2 | 300 | 80 | 50.6 | 48.0 | 127.8 | 157.6 |

1 Atmosphere under $N_2$.

I claim:

1. In a process of producing synthetic rubber wherein butadiene and a vinyl compound selected from the group consisting of styrene, acrylonitrile, alkyl acrylates and 2-vinylpyridine copolymerizable therewith are interpolymerized in an aqueous emulsion containing a member of the group consisting of alkali metal, ammonium and water-soluble amine salts of a disproportionated rosin as emulsifying agent, the method of counteracting the adverse action of free oxygen on the polymerization which comprises heat-modifying the disproportionated rosin, prior to its conversion into a salt, by heating it at about 250° to 300° C. for about 1 to 18 hours.

2. A method according to claim 1 in which the diolefin is butadiene and the vinyl compound is styrene.

3. A method according to claim 1 in which the diolefin is butadiene ond the vinyl compound is acrylonitrile.

4. A method according to claim 1 in which the disproportionated rosin is heated at a subatmospheric pressure within the range of about 20 to 300 millimeters of mercury absolute.

5. A method according to claim 1 in which the disproportionated rosin is disproportionated tall oil rosin.

6. A method of producing a disproportionated rosin capable of forming water-soluble soaps which, when incorporated into aqueous butadiene-styrene emulsions, will counteract the adverse effect of oxygen on their copolymerization into synthetic rubber, which comprises heat-modifying said disproportionated rosin by holding it at about 250° to 300° C. for about 1 to 18 hours.

7. A method according to claim 6 in which the heating is at about 270° to 300° C. for about 2 to 18 hours.

8. A method according to claim 6 in which the disproportionated rosin is heated at a subatmospheric pressure within the range of about 20 to 300 millimeters of mercury absolute.

9. A method according to claim 8 in which the rosin is heated at about 290° to 300° C. for about 1 to 2 hours under about 100 millimeters of mercury pressure.

10. A method according to claim 6 in which the disproportionated rosin is disproportionated tall oil rosin.

11. An improved disproportionated rosin consisting essentially of the product obtained by the process of claim 6.

12. An improved disproportionated tall oil rosin consisting essentially of the product obtained by the process of claim 8.

13. A member of the group consisting of the alkali metal, ammonium ond water-soluble amine salts of the disproportionated rosin of claim 11.

14. A member of the group consisting of the alkali metal, ammonium and water-soluble amine salts of the disproportionated rosin of claim 12.

15. In a process of producing synthetic rubber wherein butadiene and a vinyl compound selected from the group consisting of styrene, acrylonitrile, alkyl acrylates, and 2-vinylpyridine copolymerizable therewith are interpolymerized in an aqueous emulsion containing a member of the group consisting of alkali metal, ammonium and water-soluble amine salts of a disproportionated rosin as emulsifying agent, the method of increasing the rate of polymerization which comprises heat-modifying the disproportionated rosin, prior to its conversion into a salt, by heating it at about 250° C. to 300° C. for about 1 to 18 hours.

16. A method of producing a disproportionated rosin capable of forming water-soluble soaps which, when incorporated into aqueous butadiene-styrene emulsions, will increase the rate of their copolymerization into synthetic rubber, which comprises heat-modifying said disproportionated rosin by holding it at about 250° to 300° C. for about 1 to 18 hours.

17. An improved disproportionated rosin consisting essentially of the product obtained by the process of claim 16.

18. An improved disproportionated tall oil rosin consisting essentially of the product obtained by the process of claim 16.

References Cited

UNITED STATES PATENTS

| 2,686,776 | 8/1954 | Kein | 260—102 |
| 3,377,334 | 4/1968 | McBride et al. | 260—97.5 |

FOREIGN PATENTS

| 588,992 | 6/1947 | Great Britain. |
| 601,223 | 4/1948 | Great Britain. |

DONALD E. CZAJA, Primary Examiner

W. E. PARKER, Assistant Examiner

U.S. Cl. X.R.

260—97.5, 102